(12) United States Patent
Sullivan

(10) Patent No.: US 10,611,585 B2
(45) Date of Patent: Apr. 7, 2020

(54) SYSTEMS AND METHODS FOR UNLOADING A PICKUP TRUCK BED

(71) Applicant: Thomas Alfred Sullivan, Arvada, CO (US)

(72) Inventor: Thomas Alfred Sullivan, Arvada, CO (US)

(*) Notice: Subject to any disclaimer, the term of this patent is extended or adjusted under 35 U.S.C. 154(b) by 0 days.

(21) Appl. No.: 16/545,783

(22) Filed: Aug. 20, 2019

(65) Prior Publication Data

US 2020/0071099 A1   Mar. 5, 2020

Related U.S. Application Data

(60) Provisional application No. 62/725,769, filed on Aug. 31, 2018.

(51) Int. Cl.
*B65G 67/24* (2006.01)
*B60P 1/38* (2006.01)

(52) U.S. Cl.
CPC ............... *B65G 67/24* (2013.01); *B60P 1/38* (2013.01)

(58) Field of Classification Search
CPC . B65G 67/24; B65G 67/26; B60P 1/36; B60P 1/38
See application file for complete search history.

(56) References Cited

U.S. PATENT DOCUMENTS

| | | | | |
|---|---|---|---|---|
| 5,156,518 A * | 10/1992 | VanMatre | ............... | B60P 1/006 414/507 |
| 5,295,779 A * | 3/1994 | Mihalich | ................ | B65G 67/24 414/395 |
| 6,022,181 A * | 2/2000 | Wolterstorff | ............ | B60P 1/003 296/37.6 |
| 7,320,572 B2 * | 1/2008 | Smith | ....................... | B60P 1/38 414/437 |
| 8,033,776 B2 * | 10/2011 | Calhoun | ................ | B65G 67/24 294/26 |
| 9,744,916 B1 * | 8/2017 | Bemis | ........................ | B60P 1/64 |
| 10,035,657 B2 * | 7/2018 | Hartmann | ............... | B65G 67/24 |
| 2008/0038101 A1 * | 2/2008 | Klatt | .......................... | B60P 1/38 414/345 |
| 2010/0296902 A1 * | 11/2010 | Aschpurwis | ........... | B60P 1/365 414/499 |
| 2017/0297822 A1 * | 10/2017 | Roldan Gonzalez | ..... | B60P 1/36 |

* cited by examiner

*Primary Examiner* — Kaitlin S Joerger
(74) *Attorney, Agent, or Firm* — Acuity IP, LLC; Nathan S. Cassell

(57) ABSTRACT

Systems and methods for unloading a cargo object from the pickup truck bed. Exemplary methods include installing a cargo unloading system in the pickup truck bed, loading the cargo object into the pickup truck bed, sliding the cargo object along the carrying surface of the pickup truck bed toward a front section of the pickup truck bed, creating a rearward force on the cargo object with the unloading system, thereby causing the cargo object to slide along the carrying surface of the pickup truck bed toward the rear section of the pickup truck bed, and unloading the cargo object from the pickup truck bed by removing the cargo object from the carrying surface of the pickup truck bed.

20 Claims, 11 Drawing Sheets

SYSTEMS AND METHODS FOR UNLOADING A PICKUP TRUCK BED

CROSS-REFERENCES TO RELATED APPLICATIONS

This application claims the benefit of U.S. Provisional Patent Application No. 62/725,769 filed Aug. 31, 2018, the content of which is incorporated herein by reference.

BACKGROUND OF THE INVENTION

Delivery and/or transportation of bulky cargo is a common feature of present society. In some cases, this can be commonly done by transporting the cargo in the beds of pickup trucks. It can be difficult for some users to unload cargo from the beds of pickup trucks. Some users cannot climb into the bed of a pickup truck in order to unload the cargo. There are some devices that can assist users in unloading cargo from a pickup truck. However, these devices are not simple enough and/or lightweight enough to operate. A majority of these devices require installation on to a bed of a pickup truck, which can be difficult for some users to complete. Also, a majority of these devices are not compatible with beds of pickup trucks that contain a cover or similar object.

An objective of embodiments of the present invention is to provide users with a device that is a ball and rope device to aid in unloading a pickup truck bed. Embodiments of the present invention intend to provide users with a lightweight and simple device to handle in unloading cargo from a bed of a pickup truck. Embodiments of the present invention intend to provide users with a device that does not require installation onto a bed of a pickup truck in order to unload cargo from a bed of a pickup truck. Embodiments of the present invention intend to be compatible with all pickup truck beds.

BRIEF SUMMARY OF THE INVENTION

Embodiments of the present invention include a ball and rope device to aid in unloading cargo from a bed of a pickup truck. Embodiments of the present invention include a plurality of balls with a rope inserted through them. In some cases, the plurality of balls is located centrally along the rope. In some cases, the plurality of balls is fixed in location by a pair of knots, or similar objects, each on either end of the balls within the plurality of balls. In some cases, each end of the rope contains a handle.

In one aspect, embodiments of the present invention encompass methods for loading a cargo object into a pickup truck bed and unloading the cargo object from the pickup truck bed. Exemplary methods include installing a cargo unloading system in the pickup truck bed by attaching a first coupling mechanism of the cargo unloading system to a left side connection mechanism of the pickup truck bed and attaching a second coupling mechanism of the cargo unloading system to a right side connection mechanism of the pickup truck bed. Exemplary cargo unloading systems include a first coupling mechanism, a second coupling mechanism, an elongate flexible member coupled with the first coupling mechanism and the second coupling mechanism, a plurality of spacing members coupled with the elongate flexible member and disposed between the first coupling mechanism and the second coupling mechanism along the elongate flexible member, a first inner handle coupled with the elongate flexible member and disposed between the first coupling mechanism and the plurality of spacing members, a second inner handle coupled with the elongate flexible member and disposed between the second coupling mechanism and the plurality of spacing members, a first outer handle coupled with a first end portion of the elongate flexible member, and a second outer handle coupled with a second end portion of the elongate flexible member.

Exemplary methods also include loading the cargo object into the pickup truck bed by placing the cargo object onto a carrying surface of the pickup truck bed, within a cargo carrying zone of the pickup truck bed at least partially defined by the installed cargo unloading system, and sliding the cargo object along the carrying surface of the pickup truck bed toward a front section of the pickup truck bed;

Exemplary methods further include pulling the first inner handle toward a rear section of the pickup truck bed and pulling the second inner handle toward the rear section of the pickup truck bed, so as to create a rearward force on the cargo object with the elongate flexible member, with one or more of the plurality of spacing members, or with the elongate flexible member and one or more of the plurality of spacing members, thereby causing the cargo object to slide along the carrying surface of the pickup truck bed toward the rear section of the pickup truck bed. Exemplary methods also include loading the cargo object from the pickup truck bed by removing the cargo object from the carrying surface of the pickup truck bed.

In some cases, the elongate flexible member includes a rope. In some cases, at least one spacing member of the plurality of spacing members is secured at a location along the rope with a first stopper and a second stopper. In some cases, the first stopper includes a first rope knot and a first washer, and the second stopper includes a second rope knot and a second washer. In some cases, the first stopper includes a first zip tie and a first washer, and the second stopper includes a second zip tie and a second washer. In some cases, the first coupling mechanism of the cargo unloading system includes a first carabiner, and the second coupling mechanism of the cargo unloading system includes a second carabiner. In some cases, each of the plurality of spacing members is a ball. In some cases, a ball includes a channel that receives the elongate flexible member therethrough. In some cases, cargo unloading system has five spacing members.

In some cases, methods may include disconnecting the first coupling mechanism of the cargo unloading system from the left side connection mechanism of the pickup truck bed and disconnecting the second coupling mechanism of the cargo unloading system from the right side connection mechanism of the pickup truck bed, prior to pulling the first inner handle toward the rear section of the pickup truck bed and pulling the second inner handle toward the rear section of the pickup truck bed.

In another aspect, exemplary methods include installing the cargo unloading system in the pickup truck bed, loading the cargo object into the pickup truck bed, sliding the cargo object along the carrying surface of the pickup truck bed toward a front section of the pickup truck bed, disconnecting the first coupling mechanism of the cargo unloading system from the left side connection mechanism of the pickup truck bed and disconnecting the second coupling mechanism of the cargo unloading system from the right side connection mechanism of the pickup truck bed, pulling the first outer handle in a rearward direction away from a front section of the pickup truck bed and pulling the second outer handle in a rearward direction away from the front section of the pickup truck bed, so as to create a rearward force on the cargo object with the elongate flexible member, with one or more of the plurality of spacing members, or with the elongate flexible member and one or more of the plurality of spacing members, thereby causing the cargo object to slide along the carrying surface of the pickup truck bed toward the rear section of the pickup truck bed, and unloading the cargo object from the pickup truck bed by removing the cargo object from the carrying surface of the pickup truck bed. In some cases, the elongate flexible member includes a rope. In some cases, at least one spacing member of the plurality of spacing members is secured at a location along the rope with a first stopper and a second stopper. In some cases, the first stopper includes a first rope knot and a first washer, and the second stopper comprises a second rope knot and a second washer. In some cases, the first stopper includes a first zip tie and a first washer, and the second stopper includes a second zip tie and a second washer. In some cases, the first coupling mechanism of the cargo unloading system includes a first carabiner, and the second coupling mechanism of the cargo unloading system includes a second carabiner. In some cases, each of the plurality of spacing members is a ball. In some cases, a ball has a channel that receives the elongate flexible member therethrough. In some cases, the plurality of spacing members includes five spacing members. In some cases, methods include pulling the first inner handle in a rearward direction away from the front section of the pickup truck bed and pulling the second inner handle in a rearward direction away from the front section of the pickup truck bed, after pulling the first outer handle in a rearward direction away from the front section of the pickup truck bed and pulling the second outer handle in a rearward direction away from the front section of the pickup truck bed.

DETAILED DESCRIPTION OF THE INVENTION

Figure 1:
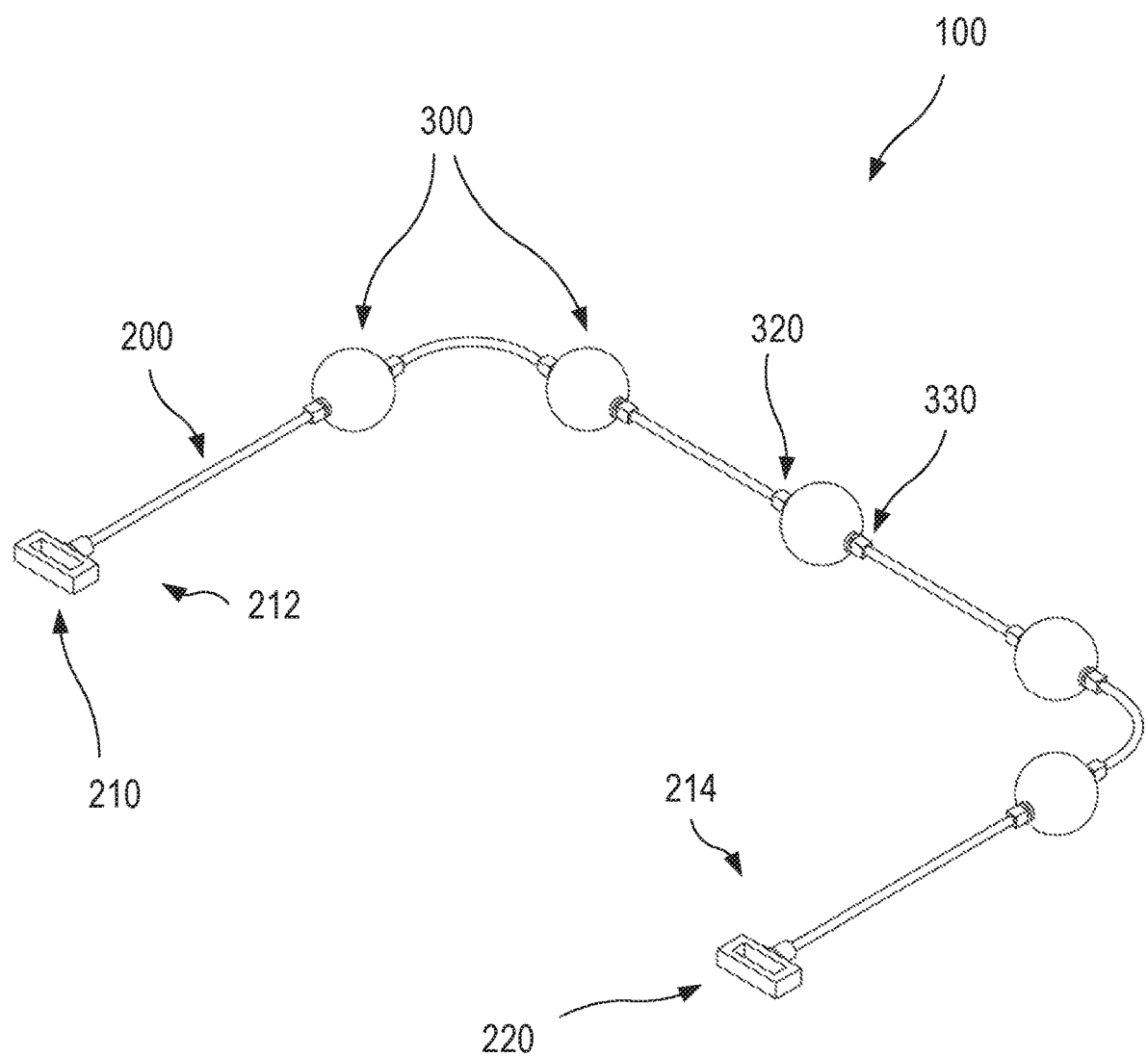
FIG. 1 provides a top/bottom view of aspects of a system for unloading a pickup truck bed, according to embodiments of the present invention.
Figure 2:
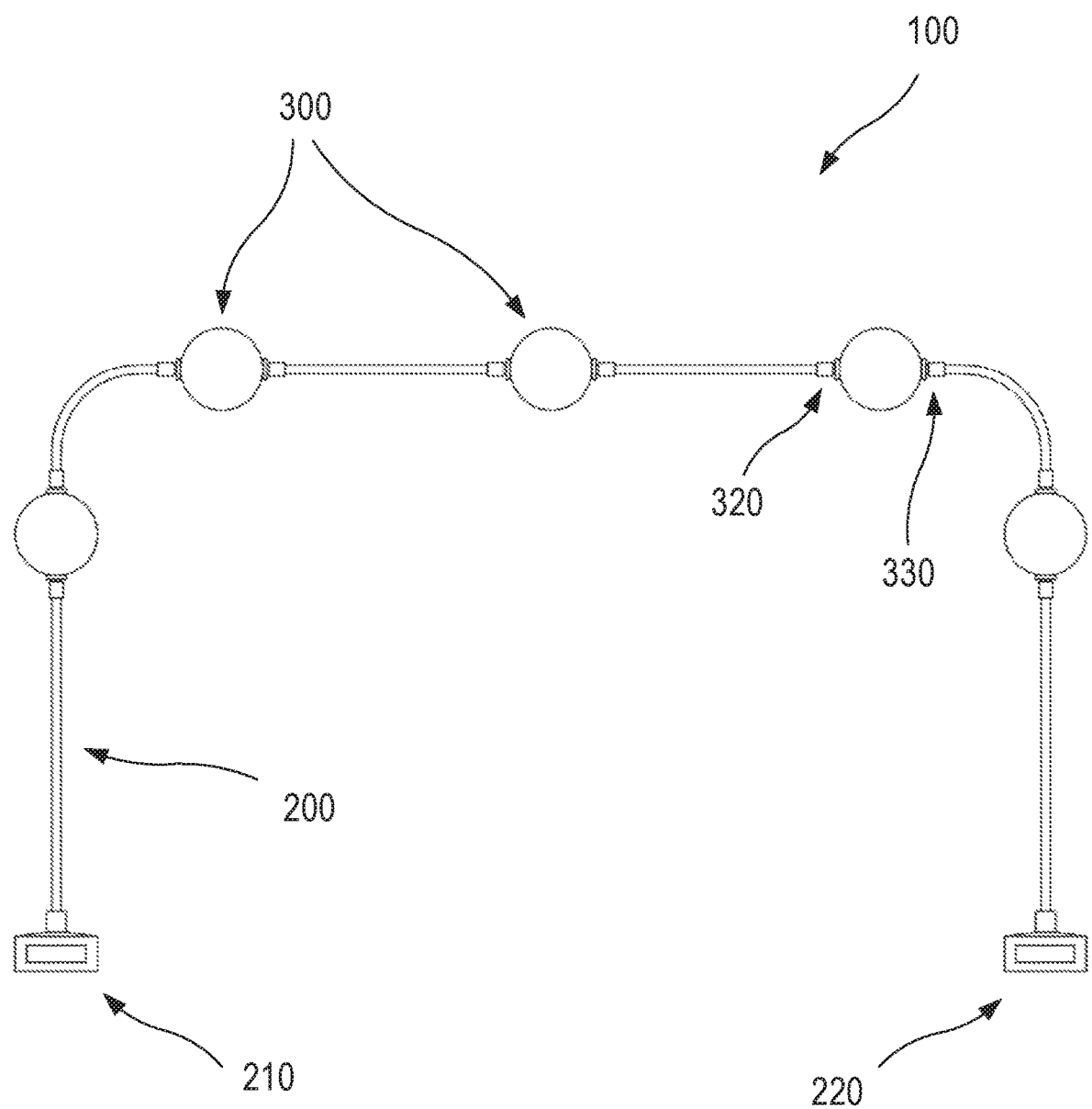
FIG. 2 provides a perspective view of aspects of a system for unloading a pickup truck bed, according to embodiments of the present invention.
Figure 3:
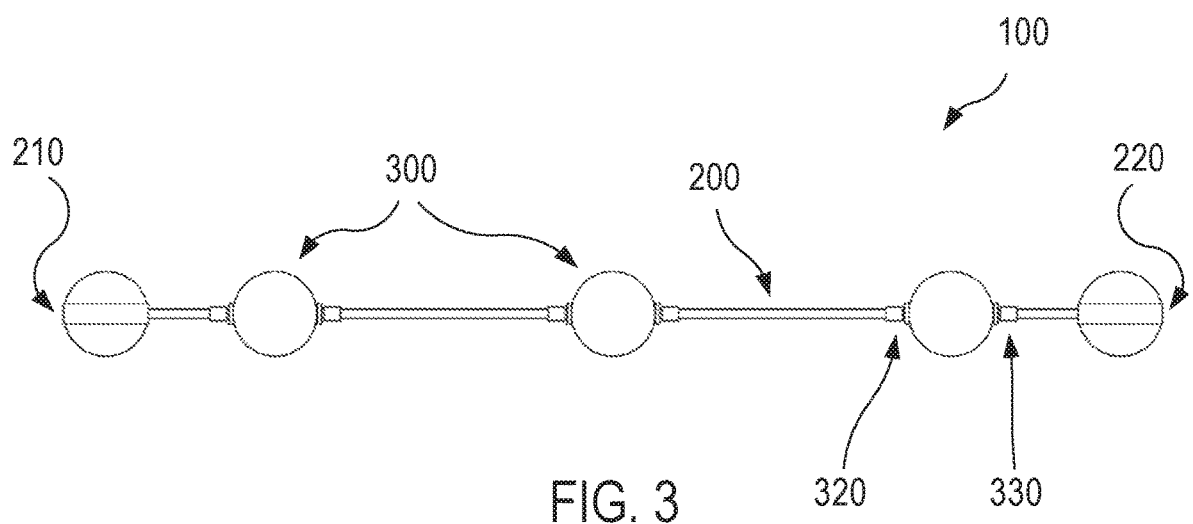
FIG. 3 provides a front view of aspects of a system for unloading a pickup truck bed, according to embodiments of the present invention.
Figure 4:
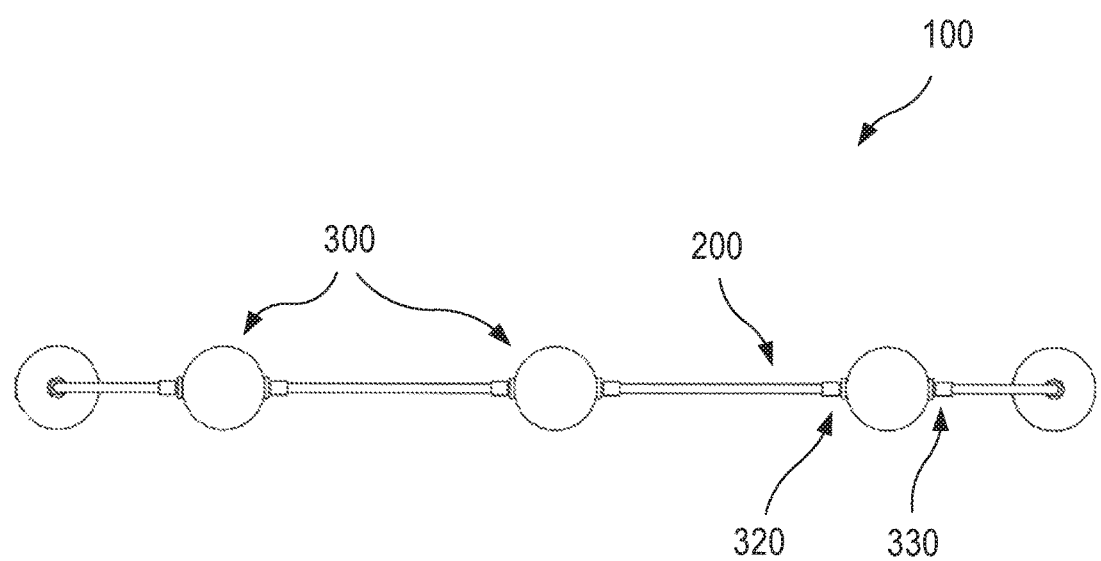
FIG. 4 provides a rear view of aspects of a system for unloading a pickup truck bed, according to embodiments of the present invention.
Figure 5:
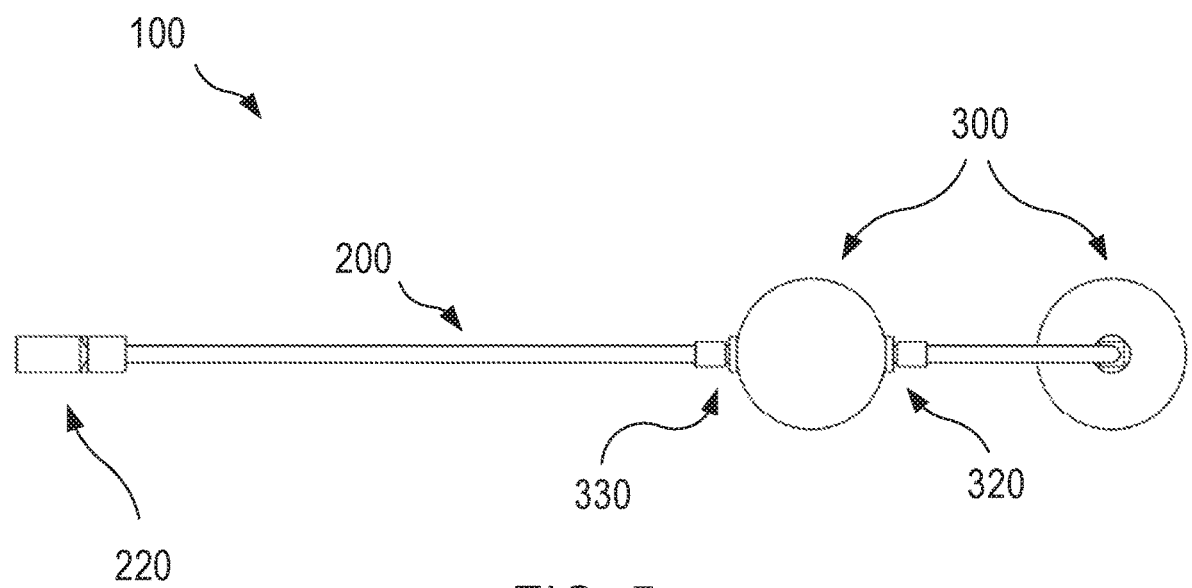
FIG. 5 provides a left/right side view of aspects of a system for unloading a pickup truck bed, according to embodiments of the present invention.

All illustrations of the drawings are to be describing selected embodiments of the present invention and are not intended to limit the scope of the present invention. All references of user or users pertain to either individual or individuals who would utilize embodiments of the present invention.

As seen in FIG. 1 through FIG. 8, embodiments of the present invention include a ball and rope device 100 to aid in unloading cargo from a bed of a pickup truck. Embodiments of the present invention can be of any shape, size, material, features, type or kind, orientation, location, quantity, components, and arrangements of components that would allow the embodiments of the present invention to fulfill the objectives and intents of the embodiments of the present invention. Exemplary embodiments of the present invention can be of material that is durable, strong, tough, rigid, weather resistant, easily manufacturable, cost efficient, environmentally sustainable, and/or lightweight. Exemplary embodiments of the present invention can include a rope 200 and a plurality of balls 300. Advantageously, such devices 100 are well suited for use in pick up trucks having caps or bed covers, where users may otherwise find it very difficult to unload cargo which is stored within the bed of the pickup. Further advantageously, the balls 300 can help to prevent the rope 200 from sliding beneath the cargo when the device 100 is used in unloading the cargo from a truck bed, because the balls 300 operate to help keep some of all of the rope 200 from contacting a carrying surface of the truck bed upon which the cargo is positioned.

As seen in FIG. 1 through FIG. 8, embodiments of the present invention contain a rope 200. The rope 200 can be of any shape, size, material, features, type or kind, orientation, location, quantity, components, and arrangements of components that would allow the embodiments of the present invention to fulfill the objectives and intents of the embodiments of the present invention. In some cases, the rope 200 can include one or more materials such as nylon, Kevlar, or other similar materials. According to some embodiments, the rope 200 can be of a length similar to the perimeter of the bed of a pickup truck or similar object. According to some embodiments, the rope 200 can include a first handle 210 and a second handle 220. The first handle 210 can be of any shape, size, material, features, type or kind, orientation, location, quantity, components, and arrangements of components that would allow the embodiments of the present invention to fulfill the objectives and intents of the embodiments of the present invention. In some instances, the first handle 210 be located on one end 212 of the rope 200. The second handle 220 can be of any shape, size, material, features, type or kind, orientation, location, quantity, components, and arrangements of components that would allow the embodiments of the present invention to fulfill the objectives and intents of the embodiments of the present invention. In some instances, the second handle 220 can be identical to the first handle 210 in shape, size, material, features, orientation, quantity, components, arrangements of components, and type or kind. In some cases, the second handle 220 can be located on the opposing free end 214 of the rope 200 from the free end 212 of the rope containing the first handle 210. In some cases, one or more handles of the device 100 can be a "T" handle. In some cases, one or more handles of the device 100 can be a "D" handle. In some cases, one or more handles of the device 100 can be an "O" handle. In some cases, one or more handles of the device 100 can be a bar handle. In some cases, the rope 200 can include or be coupled with multiple (e.g. four) handles, similar to the embodiment depicted in FIG. 9A.

As seen in FIG. 1 through FIG. 8, embodiments of the present invention contain a plurality of balls 300. The plurality of balls 300 can be of any shape, size, material, features, type or kind, orientation, location, quantity, components, and arrangements of components that would allow the embodiments of the present invention to fulfill the objectives and intents of the embodiments of the present invention. In some cases, the plurality of balls 300 be located along the rope 200 such that the plurality of balls 300 would be placed along the rear half of the bed of the pickup truck. In some cases, the plurality of balls 300 can be of a shape similar to a hollow, spherical-shaped figure. In some alternative embodiments of the present invention, the plurality of balls 300 can be of a shape similar to a cylindrical-like shaped figure similar to a roller. In some embodiments, one or more of the plurality of balls can include a channel 310, a first stopper 320, and a second stopper 330.

Figure 7:
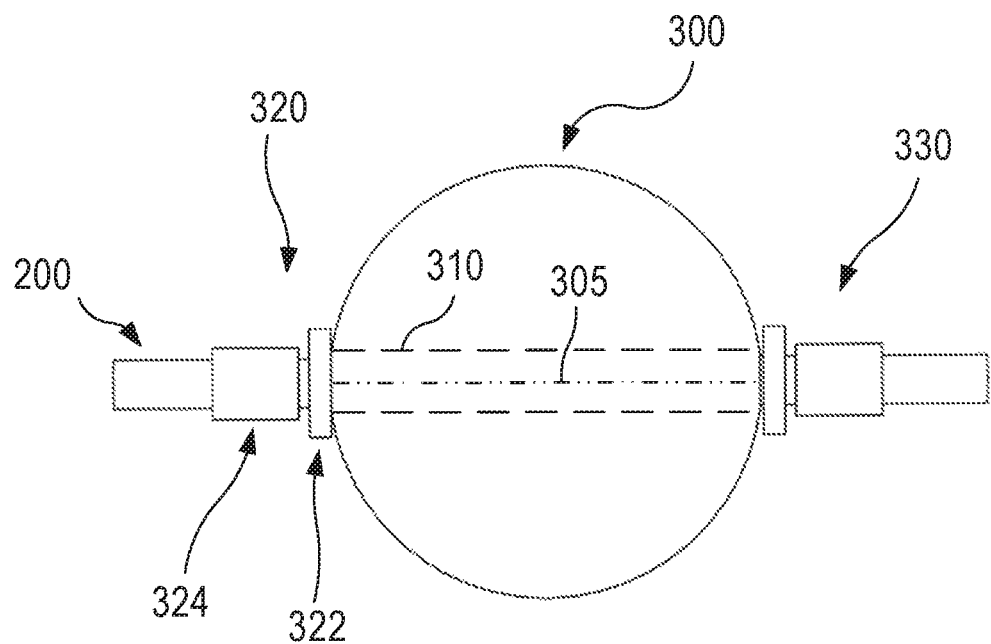
FIG. 7 provides a close-up front view of aspects of a system for unloading a pickup truck bed, according to embodiments of the present invention.
Figure 8:
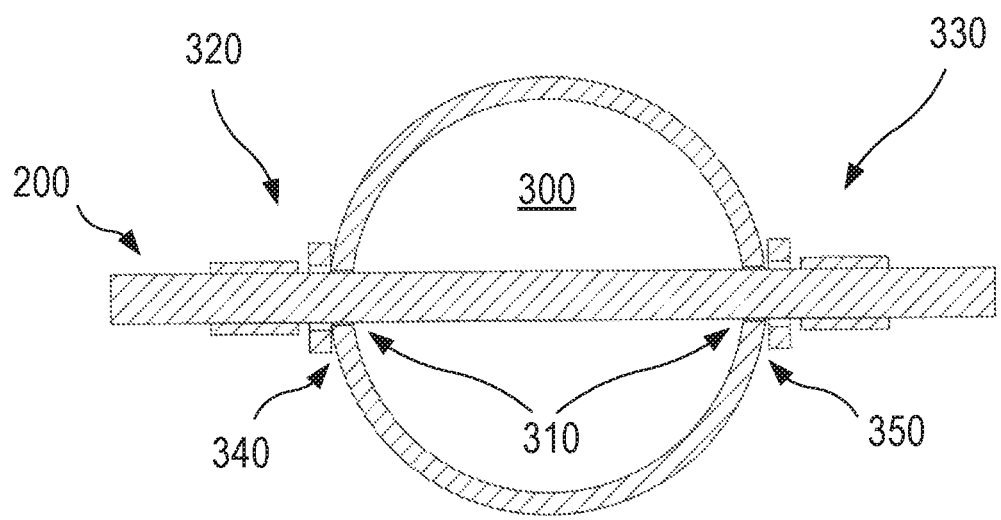
FIG. 8 provides a cross-sectional front view of aspects of a system for unloading a pickup truck bed, according to embodiments of the present invention.

As seen in FIG. 8, one or more of the plurality of balls 300 can include a channel 310. The channel 310 can be of any shape, size, material, features, type or kind, orientation, location, quantity, components, and arrangements of components that would allow the embodiments of the present invention to fulfill the objectives and intents of the embodiments of the present invention. In some embodiments, the channel 310 can be located on a central, horizontal axis 305 of one or more balls 300 of the plurality of balls, as depicted in FIG. 7. In some embodiments, the channel 310 can have a diameter slightly larger than the diameter of the rope 200. In some embodiments, the channel 310 can have a length similar to a diameter of one or more balls 300 of the plurality of balls.

Figure 6:
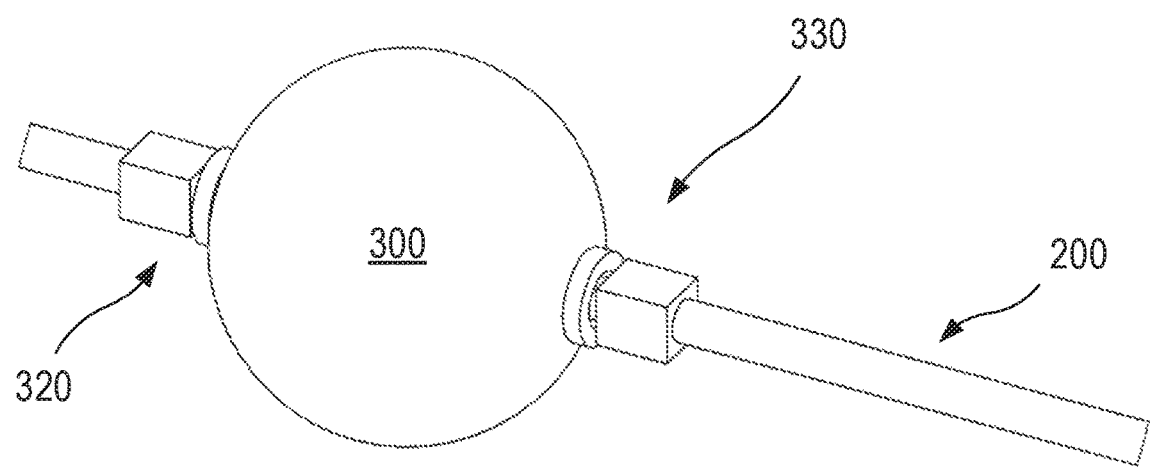
FIG. 6 provides a close-up perspective view of aspects of a system for unloading a pickup truck bed, according to embodiments of the present invention.

As seen in FIG. 6 through FIG. 8, the plurality of balls 300 can include a first stopper 320 and a second stopper 330. The first stopper 320 can be of any shape, size, material, features, type or kind, orientation, location, quantity, components, and arrangements of components that would allow the embodiments of the present invention to fulfill the objectives and intents of the embodiments of the present invention. In some cases, the first stopper 320 can have an inner diameter that is similar to the diameter of the rope 200. In some cases, the first stopper 320 can be located on lateral side face 340 of a ball 300 of a plurality of balls. In some cases, as depicted in FIG. 7, the first stopper 320 can be a combination of a washer 322 and a knot 324 on the rope, such that one or more of the plurality of balls be fixed in place between a first stopper 320 and a second stopper 320. In some stopper embodiments, a zip tie can be used instead of a knot. The second stopper 330 can be of any shape, size, material, features, type or kind, orientation, location, quantity, components, and arrangements of components that would allow the present invention to fulfill the objectives and intents of the present invention. In some cases, the second stopper 330 can be identical to the first stopper 320 in shape, size, material, features, type or kind, orientation, quantity, components, and arrangements of components. In some cases, the second stopper 330 can be located on the lateral side face 350 of a ball 300 of the plurality of balls opposite from the lateral side face 340 of the ball 300 of the plurality of balls that contains the first stopper 320.

FIGS. 9A through 9D depict aspects of methods for loading an object into a pickup truck bed and unloading the object from the pickup truck bed. As shown in the top view provided by FIG. 9A, an unloading system 1000 can be installed in a pickup truck bed 500 of pickup truck 50. System 1000 includes an elongate flexible member 1050, such as a rope, a cable, a ribbon, or the like, and one or more spacing members 1070. In some instances, a spacing member 1070 can be a sphere, a ball, a block, an ovoid body, a dodecahedron, or some other three-dimensional body. As shown here, truck bed 500 includes a front section 510 and a rear section 520. Typically, rear section 520 includes a left side connection mechanism 525, such as a D loop or a D hook, or some other anchoring device. Similarly, rear section 520 includes a right side connection mechanism 527, such as a D loop or a D hook, or some other anchoring device.

System 1000 also includes a first coupling mechanism 1100 positioned along a first end portion 1002 of the system 1000, and a second coupling mechanism 1200 positioned along a second end portion 1004 of the system 1000. In some cases, a coupling mechanism can include a carabiner, a clip, or a similar reversible connection device. What is more, system 1000 includes a first outer handle 1300 disposed distal to the first coupling mechanism 1100 and a first inner handle 1400 disposed proximal to the first coupling mechanism 1100. Likewise, system 1000 includes a second outer handle 1500 disposed distal to the second coupling mechanism 1200 and a second inner handle 1600 disposed proximal to the second coupling mechanism 1200. As shown in this embodiment, the spacing members 1070 can be disposed between the first inner handle 1400 and the second inner handle 1600.

Figure 9A:
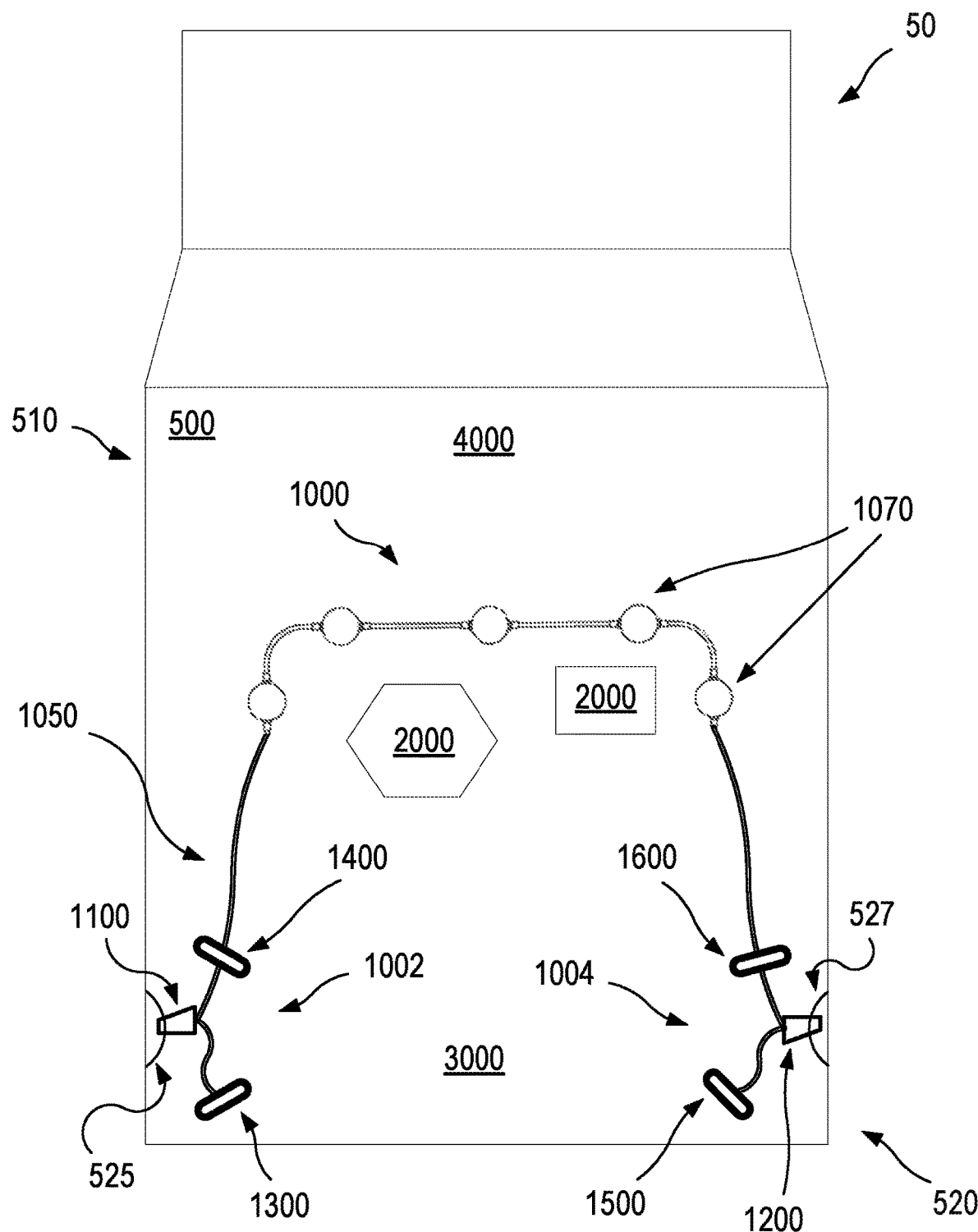
FIGS. 9A to 9D illustrate aspects of methods for unloading a pickup truck bed, according to embodiments of the present invention.

To install system 1000 in the truck bed 500, the user or operator can place the system 500 in the truck bed 500, attach the first coupling mechanism 1100 of the system 1000 with the left side connection mechanism 525 of the truck bed 500, and attach the second coupling mechanism 1200 of the system 1000 with the right side connection mechanism 527 of the truck bed 500. The user can then load the truck bed 500 by placing the cargo 2000 in the truck bed. When installed, system 1000 provides a continuous structure between the right side connection mechanism 527 of the truck bed 500 and the left side connection mechanism 525 of the truck bed 500. Hence, installed system 1000 defines a cargo carrying zone 3000 of the truck bed 500 that is distinct from an unused zone 4000 of the truck bed 500. As shown in FIG. 9A, the cargo 2000 is loaded into the cargo carrying zone 3000.

Figure 9B:
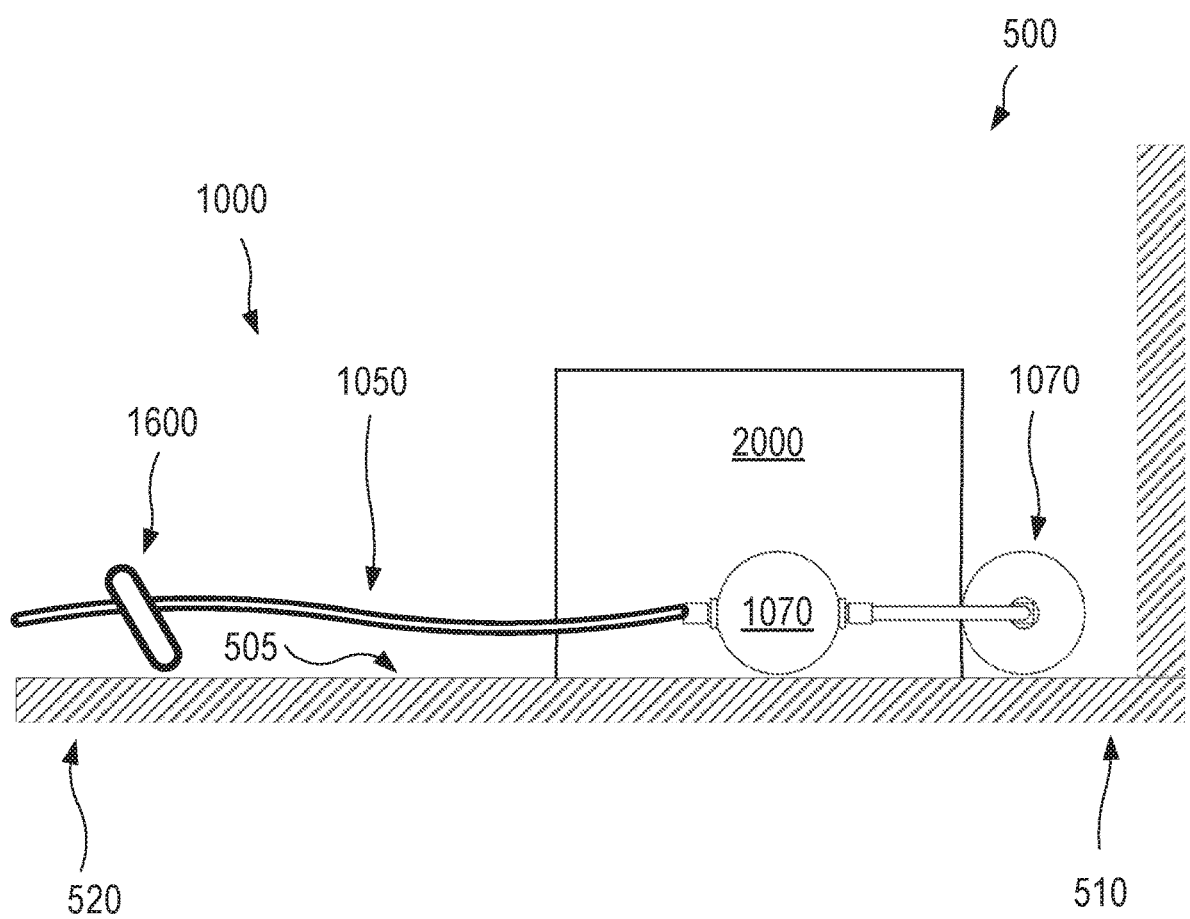

FIG. 9B provides a partial cross section side view of truck bed 500. As illustrated here, a cargo object 2000 is loaded in the truck bed 500, such that the cargo object 2000 rests upon the carrying surface 505 of the truck bed. The spacing members 1070 of the system 1000 also rest upon the carrying surface 505. The spacing members 1070 operate to help keep some or all of the elongate flexible member 1050 from touching the bed carrying surface 505. When the elongate member 1050 is drawn taught, for example by pulling handle 1600 toward the rear section 520 of the truck bed 500, the elongate member 1050 becomes more parallel with the carrying surface 505, for example to assume a more horizontal orientation. The elongate member 1050 is attached with the spacing members 1070 in such a way (e.g. at or through the middle of the spacing members 1070), so as to maintain a distance between the elongate member 1050 and the carrying surface 505. In this way, such spacing members 1070 can help to prevent the elongate flexible member 1050 from sliding beneath the cargo 2000 when the unloading system 1000 is used in unloading the cargo 2000 from the truck bed 500.

To unload the cargo 2000 from the truck bed 500, the user can choose from any of a variety of methods.

Figure 9C:
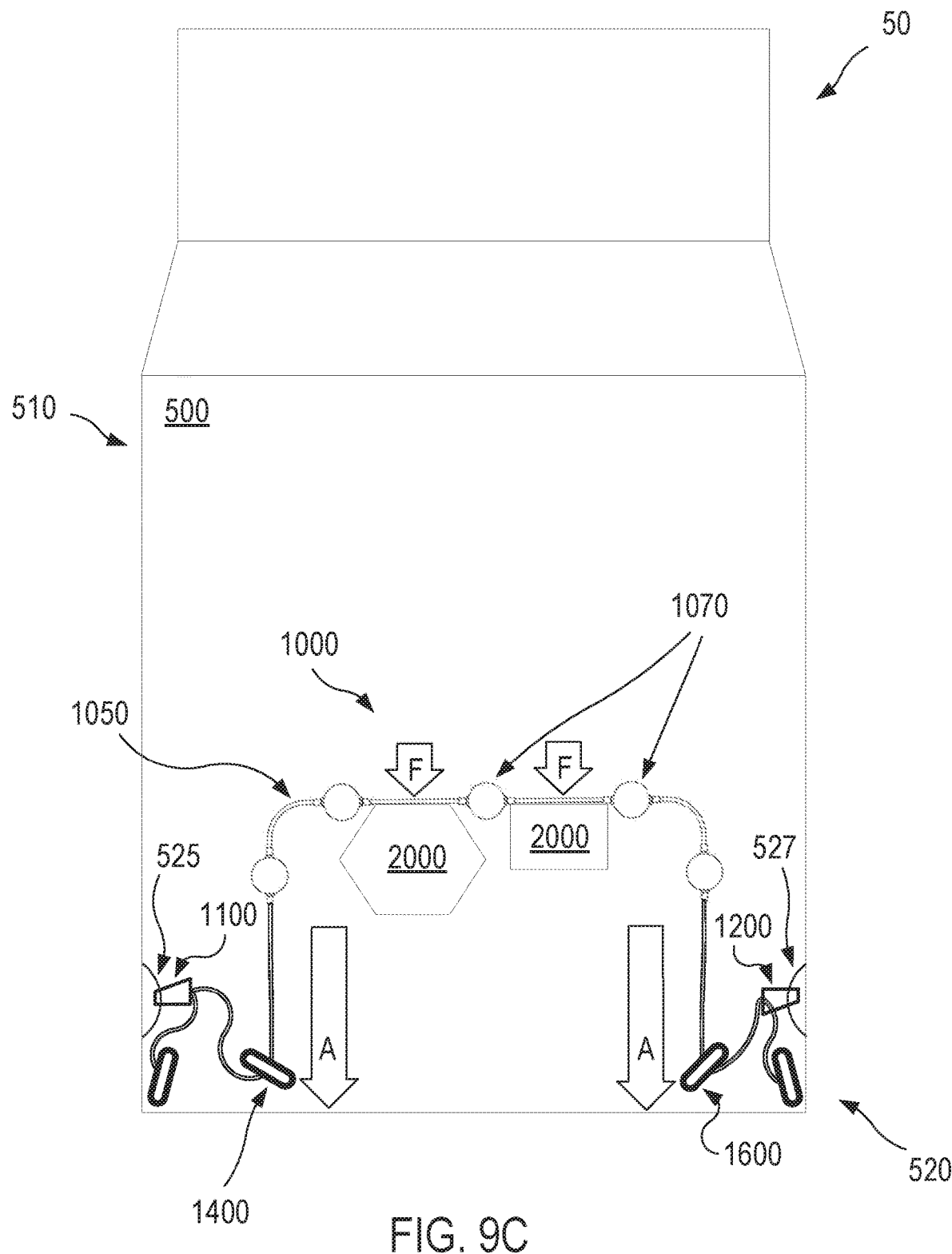

FIG. 9C depicts aspects of a method for unloading the cargo 2000. As shown here, the user can grasp the first inner handle 1400, the second inner handle 1600, or both the first inner handle 1400 and the second inner handle 1600 and draw the handle or handles toward the rear section 520 of the truck bed, as indicated by the A arrows. In this way, the system 1000 can be used to move or slide the cargo 2000 toward the rear section 520, as the elongate member 1050 and/or the spacing members 1050 contact and exert a moving force F on the cargo 2000 in the rearward direction. Once the cargo is moved sufficiently toward the rear section 520, the user can then grasp or lift the cargo 2000, and remove the cargo 2000 from the truck bed 500. As shown in the embodiment, the coupling mechanisms 1100, 1200 of the system 1000 may remain connected with the connection mechanisms 525, 527, respectively, of the truck bed 500. In some cases, the coupling mechanisms 1100, 1200 of the system 1000 may be disconnected from the connection mechanisms 525, 527, respectively, of the truck bed 500, when using the first inner handle 1400, the second inner handle 1600, or both the first inner handle 1400 and the second inner handle 1600 to draw the cargo toward the rear section 520.

Figure 9D:
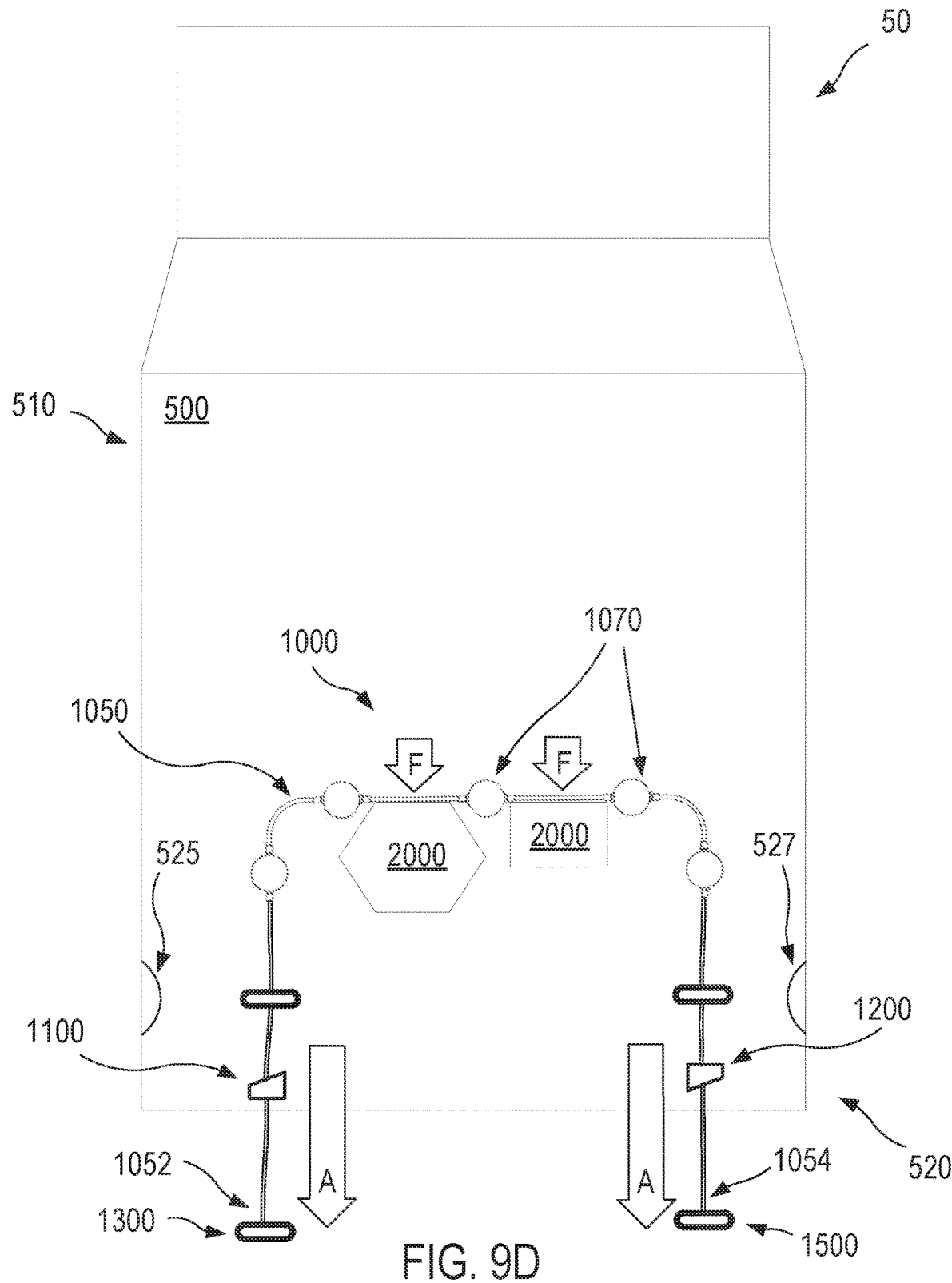

FIG. 9D depicts aspects of a method for unloading the cargo 2000. As shown here, the user can disconnect the coupling mechanisms 1100, 1200 of the system 1000 from the connection mechanisms 525, 527, respectively, of the truck bed 500, grasp the first outer handle 1300, the second outer handle 1500, or both the first outer handle 1300 and the second outer handle 1500 and draw the handle or handles toward the rear section 520 of the truck bed, as indicated by the A arrows. In this way, the system 1000 can be used to move or slide the cargo 2000 toward the rear section 520, as the elongate member 1050 and/or the spacing members 1050 contact and exert a moving force F on the cargo 2000 in the rearward direction. Once the cargo is moved sufficiently toward the rear section 520, the user can then grasp or lift the cargo 2000, and remove the cargo 2000 from the truck bed 500. As depicted here, the first outer handle 1300 is coupled with a first end portion 1052 of the elongate flexible member 1050, and the second outer handle 1500 is coupled with a second end portion 1054 of the elongate flexible member 1050.

Figure 10A:
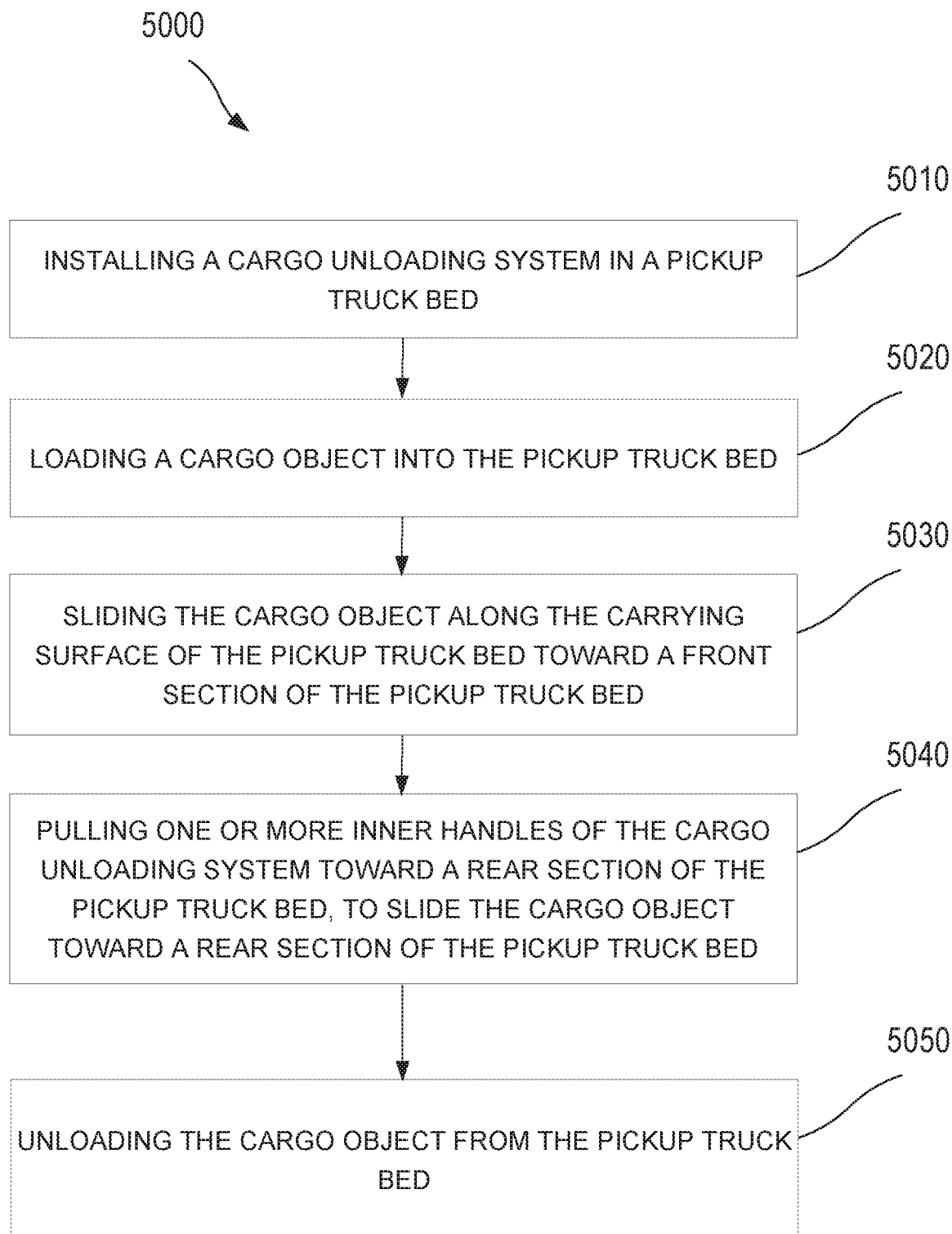
FIGS. 10A and 10B illustrate aspects of methods for unloading a pickup truck bed, according to embodiments of the present invention.

FIG. 10A depicts aspects of a method 5000 for loading a cargo object into a pickup truck bed and unloading the cargo object from the pickup truck bed. Method 5000 includes installing a cargo unloading system in the pickup truck bed, as depicted by step 5010. Method also include loading the cargo object into the pickup truck bed, as depicted by step 5020. Further, method 5000 includes sliding the cargo object along the carrying surface of the pickup truck bed toward a front section of the pickup truck bed, as indicated by step 5030. In some cases, step 5030 is optional. Method 5000 also includes pulling one or more inner handles of the cargo unloading system toward a rear section of the pickup truck bed, as depicted by step 5040. For example, step 5040 may include pulling a first inner handle of the cargo unloading system toward a rear section of the pickup truck bed and pulling the second inner handle of the cargo unloading system toward the rear section of the pickup truck bed. Method 5000 also includes unloading the cargo object from the pickup truck bed, as depicted by step 5050.

Figure 10B:
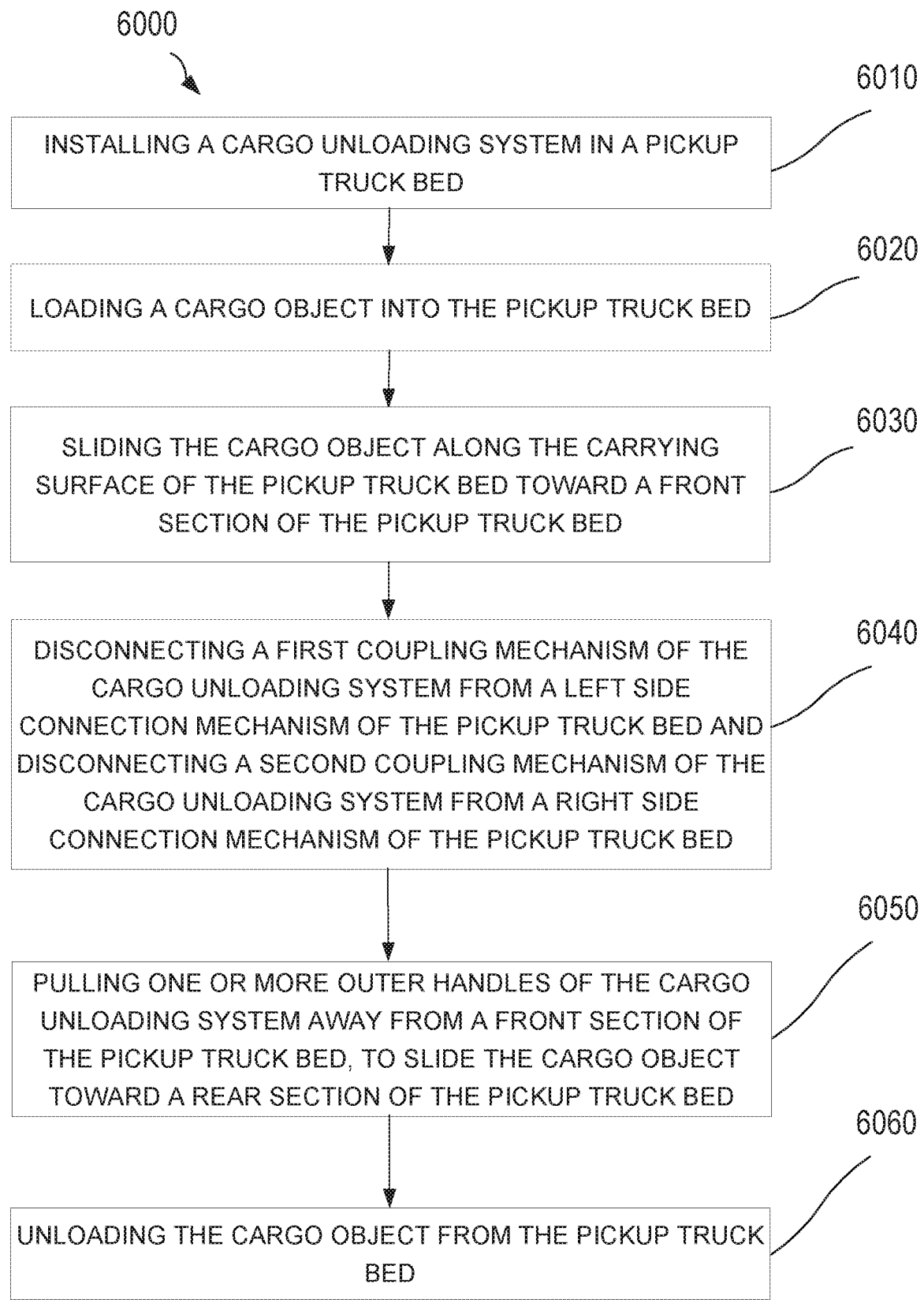

FIG. 10B depicts aspects of a method 6000 for loading a cargo object into a pickup truck bed and unloading the cargo object from the pickup truck bed. Method 6000 includes installing a cargo unloading system in the pickup truck bed, as depicted by step 6010. Method also include loading the cargo object into the pickup truck bed, as depicted by step 6020. Further, method 6000 includes sliding the cargo object along the carrying surface of the pickup truck bed toward a front section of the pickup truck bed, as indicated by step 6030. In some cases, step 6030 is optional. Method 6000 also includes disconnecting a first coupling mechanism of the cargo unloading system from a left side connection mechanism of the pickup truck bed and disconnecting a second coupling mechanism of the cargo unloading system from a right side connection mechanism of the pickup truck bed, as depicted by step 6040. Further, method 6000 includes pulling one or more outer handles of the cargo unloading system away from a front section of the pickup truck bed, to slide the cargo object toward a rear section of the pickup truck bed, as depicted by step 6050. For example, step 6050 may include pulling the first outer handle in a rearward direction away from a front section of the pickup truck bed and pulling the second outer handle in a rearward direction away from the front section of the pickup truck bed, so as to create a rearward force on the cargo object with the elongate flexible member, with one or more of the plurality of spacing members, or with the elongate flexible member and one or more of the plurality of spacing members, thereby causing the cargo object to slide along the carrying surface of the pickup truck bed toward the rear section of the pickup truck bed. Method 6000 also includes unloading the cargo object from the pickup truck bed, as depicted by step 6060.

Although embodiments of the present invention have been explained in relation to one or more preferred embodiments, it is to be understood that many other possible modifications and variations can be made without departing from the spirit and scope of the invention.

All features of the described systems and devices are applicable to the described methods mutatis mutandis, and vice versa. Embodiments of the present invention encompass kits having systems for unloading a pickup truck bed as disclosed herein. In some embodiments, the kit includes one or more systems for unloading a pickup truck bed, along with instructions for using the system for example according to any of the methods disclosed herein.

Although the foregoing invention has been described in some detail by way of illustration and example for purposes of clarity of understanding, one of skill in the art will appreciate that certain changes, modifications, alternate constructions, and/or equivalents may be practiced or employed as desired, and within the scope of the appended claims. In addition, each reference provided herein in incorporated by reference in its entirety to the same extent as if each reference was individually incorporated by reference. Relatedly, all publications, patents, patent applications, journal articles, books, technical references, and the like mentioned in this specification are herein incorporated by reference to the same extent as if each individual publication, patent, patent application, journal article, book, technical reference, or the like was specifically and individually indicated to be incorporated by reference.

What is claimed is:

1. A method for loading a cargo object into a pickup truck bed and unloading the cargo object from the pickup truck bed, comprising:

installing a cargo unloading system in the pickup truck bed by attaching a first coupling mechanism of the cargo unloading system to a left side connection mechanism of the pickup truck bed and attaching a second coupling mechanism of the cargo unloading system to a right side connection mechanism of the pickup truck bed, wherein the cargo unloading system comprises the first coupling mechanism, the second coupling mechanism, an elongate flexible member coupled with the first coupling mechanism and the second coupling mechanism, a plurality of spacing members coupled with the elongate flexible member and disposed between the first coupling mechanism and the second coupling mechanism along the elongate flexible member, a first inner handle coupled with the elongate flexible member and disposed between the first coupling mechanism and the plurality of spacing members, a second inner handle coupled with the elongate flexible member and disposed between the second coupling mechanism and the plurality of spacing members, a first outer handle coupled with a first end portion of the elongate flexible member, and a second outer handle coupled with a second end portion of the elongate flexible member;

loading the cargo object into the pickup truck bed by placing the cargo object onto a carrying surface of the pickup truck bed, within a cargo carrying zone of the pickup truck bed at least partially defined by the installed cargo unloading system;

sliding the cargo object along the carrying surface of the pickup truck bed toward a front section of the pickup truck bed;

pulling the first inner handle toward a rear section of the pickup truck bed and pulling the second inner handle toward the rear section of the pickup truck bed, so as to create a rearward force on the cargo object with the elongate flexible member, with one or more of the plurality of spacing members, or with the elongate flexible member and one or more of the plurality of spacing members, thereby causing the cargo object to slide along the carrying surface of the pickup truck bed toward the rear section of the pickup truck bed; and unloading the cargo object from the pickup truck bed by removing the cargo object from the carrying surface of the pickup truck bed.

2. The method of claim 1, wherein the elongate flexible member comprises a rope.

3. The method of claim 2, wherein at least one spacing member of the plurality of spacing members is secured at a location along the rope with a first stopper and a second stopper.

4. The method of claim 3, wherein the first stopper comprises a first rope knot and a first washer, and wherein the second stopper comprises a second rope knot and a second washer.

5. The method of claim 3, wherein the first stopper comprises a first zip tie and a first washer, and wherein the second stopper comprises a second zip tie and a second washer.

6. The method of claim 1, wherein the first coupling mechanism of the cargo unloading system comprises a first carabiner, and wherein the second coupling mechanism of the cargo unloading system comprises a second carabiner.

7. The method of claim 1, wherein each of the plurality of spacing members comprises a ball.

8. The method of claim 7, wherein each ball comprises a channel that receives the elongate flexible member therethrough.

9. The method of claim 1, wherein the plurality of spacing members comprises five spacing members.

10. The method of claim 1, further comprising, prior to pulling the first inner handle toward the rear section of the pickup truck bed and pulling the second inner handle toward the rear section of the pickup truck bed, disconnecting the first coupling mechanism of the cargo unloading system from the left side connection mechanism of the pickup truck bed and disconnecting the second coupling mechanism of the cargo unloading system from the right side connection mechanism of the pickup truck bed.

11. A method for loading a cargo object into a pickup truck bed and unloading the cargo object from the pickup truck bed, comprising:

installing a cargo unloading system in the pickup truck bed by attaching a first coupling mechanism of the cargo unloading system to a left side connection mechanism of the pickup truck bed and attaching a second coupling mechanism of the cargo unloading system to a right side connection mechanism of the pickup truck bed, wherein the cargo unloading system comprises the first coupling mechanism, the second coupling mechanism, an elongate flexible member coupled with the first coupling mechanism and the second coupling mechanism, a plurality of spacing members coupled with the elongate flexible member and disposed between the first coupling mechanism and the second coupling mechanism along the elongate flexible member, a first inner handle coupled with the elongate flexible member and disposed between the first coupling mechanism and the plurality of spacing members, a second inner handle coupled with the elongate flexible member and disposed between the second coupling mechanism and the plurality of spacing members, a first outer handle coupled with a first end portion of the elongate flexible member, and a second outer handle coupled with a second end portion of the elongate flexible member;

loading the cargo object into the pickup truck bed by placing the cargo object onto a carrying surface of the pickup truck bed, within a cargo carrying zone of the pickup truck bed at least partially defined by the installed cargo unloading system;

sliding the cargo object along the carrying surface of the pickup truck bed toward a front section of the pickup truck bed;

disconnecting the first coupling mechanism of the cargo unloading system from the left side connection mechanism of the pickup truck bed and disconnecting the second coupling mechanism of the cargo unloading system from the right side connection mechanism of the pickup truck bed;

pulling the first outer handle in a rearward direction away from a front section of the pickup truck bed and pulling the second outer handle in a rearward direction away from the front section of the pickup truck bed, so as to create a rearward force on the cargo object with the elongate flexible member, with one or more of the plurality of spacing members, or with the elongate flexible member and one or more of the plurality of spacing members, thereby causing the cargo object to slide along the carrying surface of the pickup truck bed toward the rear section of the pickup truck bed; and unloading the cargo object from the pickup truck bed by removing the cargo object from the carrying surface of the pickup truck bed.

12. The method of claim 11, wherein the elongate flexible member comprises a rope.

13. The method of claim 12, wherein at least one spacing member of the plurality of spacing members is secured at a location along the rope with a first stopper and a second stopper.

14. The method of claim 13, wherein the first stopper comprises a first rope knot and a first washer, and wherein the second stopper comprises a second rope knot and a second washer.

15. The method of claim 13, wherein the first stopper comprises a first zip tie and a first washer, and wherein the second stopper comprises a second zip tie and a second washer.

16. The method of claim 11, wherein the first coupling mechanism of the cargo unloading system comprises a first carabiner, and wherein the second coupling mechanism of the cargo unloading system comprises a second carabiner.

17. The method of claim 11, wherein each of the plurality of spacing members comprises a ball.

18. The method of claim 17, wherein each ball comprises a channel that receives the elongate flexible member therethrough.

19. The method of claim 11, wherein the plurality of spacing members comprises five spacing members.

20. The method of claim 11, further comprising, after pulling the first outer handle in a rearward direction away from the front section of the pickup truck bed and pulling the second outer handle in a rearward direction away from the front section of the pickup truck bed, pulling the first inner handle in a rearward direction away from the front section of the pickup truck bed and pulling the second inner handle in a rearward direction away from the front section of the pickup truck bed.

* * * * *